United States Patent [19]

Aizawa et al.

[11] 4,235,277

[45] Nov. 25, 1980

[54] METHOD OF FORMING THREE-DIMENSIONAL NETWORK POROUS METALLIC STRUCTURE HAVING CONTINUOUS INTERNAL CAVITY

[75] Inventors: Tatsushi Aizawa, Chiyodamura; Tatsuo Natori, Kashiwa; Masakatsu Hayashi, Ushikumachi; Takeo Tanaka, Minorimachi, all of Japan

[73] Assignee: Hitachi, Ltd., Japan

[21] Appl. No.: 946,339

[22] Filed: Sep. 27, 1978

[30] Foreign Application Priority Data

Dec. 16, 1977 [JP] Japan ................................. 52-150563

[51] Int. Cl.³ ....................... B22D 25/02; B22D 18/04
[52] U.S. Cl. ........................................ 164/36; 164/34; 164/119; 264/44; 264/221; 264/317; 425/DIG. 12
[58] Field of Search ..................... 264/44, 221, 317; 164/34, 35, 36, 119; 425/DIG. 12

[56] References Cited

U.S. PATENT DOCUMENTS

| 3,078,552 | 2/1963 | Grandey | 264/44 X |
|---|---|---|---|
| 3,111,396 | 11/1963 | Ball | 264/44 |
| 3,459,254 | 8/1969 | Dearth | 164/119 |
| 3,616,841 | 11/1971 | Walz | 264/44 X |
| 3,628,598 | 12/1971 | MacNeill et al. | 164/119 X |
| 3,656,539 | 4/1972 | Zickefoose | 164/119 X |
| 3,666,526 | 5/1972 | Ettinger et al. | 264/44 X |
| 3,778,336 | 12/1973 | Adams | 264/44 X |
| 3,946,039 | 3/1976 | Walz | 164/34 X |

Primary Examiner—Philip Anderson
Attorney, Agent, or Firm—Craig and Antonelli

[57] ABSTRACT

A three-dimensional network porous metallic structure is formed by filling the internal cavity of a mold, which has been prepared by making use of a three-dimensional network resin pattern, through driving the molten metal into the cavity by a pressure or through sucking the molten metal into the cavity by reducing the pressure in the cavity. The porous metallic structure thus obtained is characterized by a large specific surface area, as well as a reduced pressure drop of fluid passing through this structure, and, therefore, is fit for various uses such as the material of fins of heat exchangers, various filters and so forth.

7 Claims, 4 Drawing Figures

METHOD OF FORMING THREE-DIMENSIONAL NETWORK POROUS METALLIC STRUCTURE HAVING CONTINUOUS INTERNAL CAVITY

BACKGROUND OF THE INVENTION

The present invention relates to a method of forming a three-dimensional network porous metallic structure having a continuous internal cavity, characterized by an extremely large specific surface area and porosity and, accordingly, minimized pressure drop of a fluid passing through the structure.

The three-dimensional network porous metallic structure of the invention has, owing to its advantageous characteristics, various extended industrial uses such as the materials for fins of heat exchangers, liquid-liquid or liquid-gass mixer or separator, sound absorbing or insulating material, damping material, catalysts, flame extinguishing materials, wick materials for heat pipes, ornamental materials, architectural materials and so forth.

Conventionally, various methods have been proposed and practically carried out for forming porous metallic structures.

These conventional methods are, for example:

(a) to blow a gas into a molten metal to allow the metal to foam;

(b) to make pulverized or granulated metal to foam;

(c) to insert a substance which evolves a gas when heated into a molten metal;

(d) to heat to high temperature an admixture of a metal and a substance which evolves a gas when heated;

(e) to press-feed a molten metal into a mold cavity charged with sodium chloride particles;

(f) to allow a molten metal to flow out through a narrow nozzle;

(g) to obtain the porous metal by sintering; and so forth.

All of above mentioned methods, except the method (g), have only limited use, because the internal cavities in the porous metal product are not made continuous or, even if made continuous, they communicate one another only through extremely narrow, coarctate parts, resulting in various shortcomings such as unacceptably large flow resistance by which the gas flowing therethrough is encountered. At the same time, the porosity is as small as 50% or so, and the specific surface area is disadvantageously small.

The method (g) relying upon the sintering is also disadvantageous in that it cannot be used for forming such a thick structure as having a thickness exceeding about 15 mm. At the same time, this method is quite time-consuming and invonveniently raises the cost of manufacture. Further, this method can be used effectively only with some specific metals such as alloys of Nickel (Ni), Copper (Cu) and Iron (Fe). Thus, this method cannot be applied to the formation of porous body with Aluminum (Al) and its alloy.

SUMMARY OF THE INVENTION

It is therefore a major object of the invention to provide a method of forming such a three-dimensional network porous metallic structure having a continuous internal cavity, as being entirely free from restrictions in the kind of material, shape and size of the product, which have been imposed on the conventional methods, and, accordingly, having various uses, thereby to overcome the problems of the conventional technics.

To this end, according to teh invention, there is provided a method of forming a three-dimensional network porous metallic structure which has, briefly, the following features.

At first, a pattern of the three-demensional porous structure is prepared with a resin, and the cavity in the structure is filled with a mold-forming material such as plaster. Subsequently, the resin pattern is evaporated and extinguished by, for example, heating or the like measure, simultaneously achieving a hardening of the molding-forming material. Then, the hardened mold is brought into contact with a molten metal under pressure, so that the internal cavity of the mold may be filled with the molten metal by pressure. After the solidification of the metal, the mold is removed by dissolving it in water or other dissolving liquid, or mechanically by means of water jet, shot blast and the like measure. The mold cavity may be filled with the molten metal by other way than the pressurizing of the molten metal as described, e.g. by a pressure reduction or an evacuation of the mold cavity. In such case, the molten metal disposed at one side of the mold is sucked across the mold by a vacuum established at the other side of the mold, so as to invade and fill the mold cavity.

The above and other objects, as well as advantageous features of the invention will become more clear from the following description of the preferred embodiment with referenct to the accompanying drawings.

DESCRIPTION OF THE PREFERRED EMBODIMENTS

Figure 1:
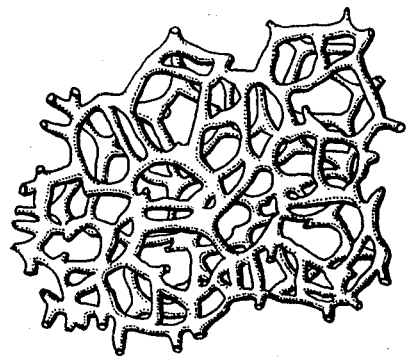
FIG. 1 is a schematic illustration of an example of the shape of a three-dimensional porous metallic structure produced by the method in accordance with the invention.

The three-dimensional network resin pattern as referred to in this specification and, accordingly, the porous metallic structure to be obtained by the method of the invention have a shape as exemplarily shown in FIG. 1.

It will be clear to those skill in the art that the sizes and shapes of the lattices, as well as the shapes and sizes of the areas defined by the lattices of the resin pattern can be changed as desired, regularly or irregularly, so that the porous metallic structure, which is obtained as a replica of the resin pattern, may have various shapes or forms exactly replicating the shapes or forms of the resin pattern.

Preferred embodiments of the invention will be described hereinafter.

Embodiment 1

Figure 2:
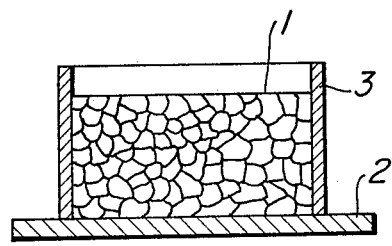
FIG. 2 is an illustration of a step of filling a pattern with a mold-forming material.

A pattern 1 made of a foamed urethane, having a number of pores of about 3 mm dia. defined by lattices of thickness ranging between 0.05 mm and 0.7 mm was prepared and placed on a molding board 2 as shown in FIG. 2. A frame or enclosure 3 was placed on the same board 2 to surround the pattern 1. Meanwhile, the mold-forming material was prepared by mixing throughly and uniformly a powdered mold-forming plaster and water at a ratio of 2:1 by weight, until they came to form a slurry. The mold-forming material in the form of slurry was then poured into the pattern 1 of foamed urethane, while imparting a vibration to the latter through the molding board 2, thereby to completely fill the internal cavity of the pattern 1, thus forming a mold 4. Then, after hardened a bit, the mold was separated from the molding board 2 and the surrounding enclosure 3, and heated for 30 minutes at a temperature of 650° C., subsequently to a one hour drying at 100° C., thereby to evaporate and extinguish the foamed urethane pattern 1.

Figure 3:
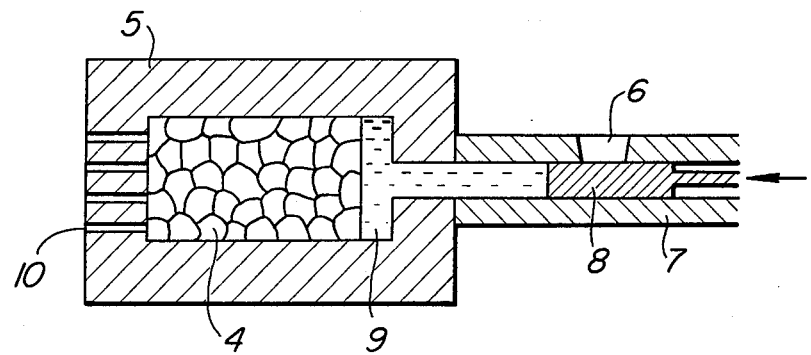
FIG. 3 is an illustration of a step of filling a mold cavity with a molten metal.

Subsequently, the mold 4 was placed in a die 5, as shown in FIG. 3. Then, a cylinder 7 was charged with molten aluminum 9, through a charging port 6. The molten aluminum was pressurized by means of a piston 8. As a result, the molten aluminum was forced into the internal cavity of the mold 4, so as to completely fill the latter, expelling the gas residing in the cavity through gas purging ports 10. After the pressurizing of the molten aluminum for 10 seconds, the mold 4 was taken out of the die 5, and was subjected to a flow of water, so that the plaster may be washed away. Consequently, a three dimensional network porous structure of aluminum having a clear and distinct continuous internal cavity was obtained.

Embodiment 2

An extinguishable mold-forming material was made to flow into the internal cavity of a pattern of foamed urethane prepared in the same manner as that of the first embodiment. The pattern filled with the mold-forming material was then heated at 650° C. for 60 minutes, so as to completely evaporate and extinguish the pattern, thereby to obtain a casting mold having minute three-dimensional network cavity.

Figure 4:
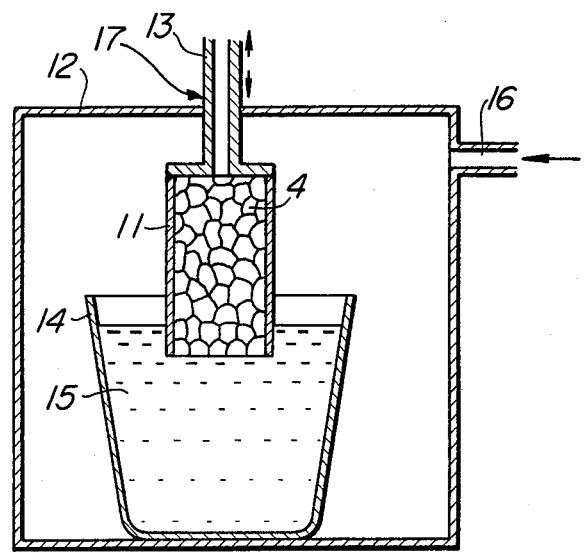
FIG. 4 is an illustration of the same step as that shown in FIG. 3 achieved by a different way.

The mold 4 thus obtained was then encased within a metal tube 11, which tube is attached to a holder is; the holder and metal tube forming the holding device 17. The mold 4 as encased within the metal tube 11 is disposed in a pressure vessel 12, as shown in FIG. 4. At the same time, a crucible 14 filled with molten aluminum 15 heated to 750° C. was placed in the pressure vessel 12. Then, the holder 13 was lowered and fixed at such a level that the lower portion of the casting mold 4 is dipped into the molten aluminum 15 to the depth of 5 mm from the surface of the latter. As can be seen in FIG. 4, the holder 13 of the holding device 17 has a passageway in communication with the mold and extending external to the pressure vessel to permit the pressure on the mold on the end thereof opposite to the end dipped into the molten aluminum to be less than the pressure on the end dipped into the molten aluminum, so that upon raising the internal pressure of the pressure vessel, the molten metal is easily forced into the mold. For example, the passageway can extend into the atmosphere. Subsequently, the internal pressure of the pressure vessel 12 was increased to 2 atm. by a compressed air forced into the vessel 12 through an air feeding port 16. The increased internal pressure was maintained for 10 seconds. After reducing the internal pressure to the atmospheric pressure, the casting mold 4 was taken out of the pressure vessel 12, and was left in the flow of water for 5 minutes, so as to remove the mold material. Consequently, a three-dimensional network porous structure of aluminum having a continuous inner cavity was obtained.

Although not mentioned in the foregoing description of the preferred embodiments, needless to say, the three dimensional network resin pattern may be formed with various materials other than the described polyurethane, e.g. polyether, polyester, rubber or the like resinous materials.

At the same time, other ordinary mold-forming materials than the described plaster or precision-casting slurry can be used as the material for forming the mold.

The removal of the pattern can be made by means of a solvent, in case where the material of the pattern is soluble in such solvent.

Further, according to the invention, the three-dimensional network porous structure of the invention can be formed with various metallic materials including, not only Aluminum (Al), Copper (Cu) and Iron (Fe), but also ordinarily used iron-based alloys and alloys of non-ferrous metals such as Lead (Pb), Tin (Sn), Zinc (Zn), Magnesium (Mg) and the like.

As has been described, according to the invention, three-dimensional network porous metallic structures having various uses such as a wick material of heat pipes, sound absorbing or insulating material, material for fins of heat exchanger, material for various filters and so forth, can be formed to have any desired size and shape, without being subjected to such restriction in the kind of material and size as imposed to the sintering technic which is ineffective, as mentioned before, to aluminum material.

What is claimed is:

1. A method of forming a three-dimensional network porous metallic structure having a continuous internal cavity, comprising the steps of: preparing a three-dimensional network pattern made of a resin; filling the internal cavity of said pattern with a mold-forming material; extinguishing said pattern to form a mold having a three-dimensional network cavity; placing a molten metal reservoir, containing molten metal, in a pressure vessel; bringing a portion of said mold into contact with said molten metal held in the reservoir located in said pressure vessel, said mold being held in a holding device which has a passageway which is in communication with said mold and extends external to said pressure vessel, said holding device enclosing said mold except for said portion of said mold and the part of the mold in communication with the passageway; raising the pressure in said pressure vessel to 2 atmospheres to thereby raise the pressure on the molten metal in the molten metal reservoir so as to feed said molten metal by pressure into the internal cavity of said mold; and removing said mold after the solidification of said metal in the internal cavity of the mold.

2. A method of forming a three-dimensional network porous metallic structure having a continuous internal cavity as set forth in claim 1, wherein the resin of which said pattern is made is a material selected from a group consisting of polyurethane, polyether, polyester and rubber.

3. A method of forming a three-dimensional network porous metallic structure having a continuous internal cavity as set forth in claim 2, wherein said mold is made of plaster.

4. A method of forming a three-dimensional network porous metallic structure having a continuous internal cavity as set forth in claim 1, wherein said pattern is extinguished by means of a solvent.

5. A method of forming a three-dimensional network porous metallic structure having a continuous internal cavity as set forth in claim 1, wherein said pattern is extinguished by heating.

6. A method of forming a three-dimensional network porous metallic structure having a continuous internal cavity as set forth in claim 1, wherein the pattern has a number of pores defined by lattices of thickness ranging between 0.05 mm and 0.7 mm.

7. A method of forming a three-dimensional network porous metallic structure having a continuous internal cavity as set forth in claim 1, wherein said portion of said mold is brought into contact with the molten metal by dipping said mold into the molten metal such that the lower end of the mold is 5 mm below the surface of the molten metal.

* * * * *